(12) United States Patent
Druta et al.

(10) Patent No.: US 11,970,029 B2
(45) Date of Patent: Apr. 30, 2024

(54) ADAPTER, TYRE PARAMETER MONITORING SYSTEM AND METHOD FOR MOUNTING A TYRE PARAMETER MONITORING SYSTEM ONTO A WHEEL RIM

(71) Applicant: Continental Automotive GmbH, Hannover (DE)

(72) Inventors: Paul Druta, Timisoara (RO); Ilie Atanasoe, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 403 days.

(21) Appl. No.: 17/309,511

(22) PCT Filed: Nov. 21, 2019

(86) PCT No.: PCT/EP2019/082049
§ 371 (c)(1),
(2) Date: Jun. 2, 2021

(87) PCT Pub. No.: WO2020/114792
PCT Pub. Date: Jun. 11, 2020

(65) Prior Publication Data
US 2022/0048341 A1    Feb. 17, 2022

(30) Foreign Application Priority Data

Dec. 5, 2018 (EP) ..................................... 18465629
Jan. 9, 2019 (GB) ..................................... 1900275

(51) Int. Cl.
B60C 23/04    (2006.01)
B60C 29/00    (2006.01)
F16L 27/04    (2006.01)

(52) U.S. Cl.
CPC ...... B60C 23/0494 (2013.01); B60C 23/0408 (2013.01); B60C 29/005 (2013.01); F16L 27/04 (2013.01)

(58) Field of Classification Search
CPC ............ B60C 23/0408; B60C 23/0494; B60C 29/005; F16L 27/04
See application file for complete search history.

(56) References Cited

U.S. PATENT DOCUMENTS 6,340,929 B1   1/2002 Katou
6,952,955 B1   10/2005 Uleski
(Continued)

FOREIGN PATENT DOCUMENTS

CN   201376472 Y   1/2010
CN   201769634 U   3/2011
(Continued)

OTHER PUBLICATIONS

Japanese Decision to Grant a Patent drafted Aug. 31, 2022, for the counterpart Japanese Patent Application No. 2021-521208.
(Continued)

*Primary Examiner* — Jill E Culler

(57) ABSTRACT

Adapter, tyre parameter monitoring system and method for mounting a tyre parameter monitoring system onto a wheel rim In an embodiment, a tyre parameter monitoring system (2) is provided that comprises an electronic module (4) with a fitting (6) for a snap-in valve, a ball stud (8) coupled to the fitting (6) and a valve stem (10) for a clamp-in valve. The valve stem (10) has a ball socket (12) that is coupled to the ball stud (8) for form a ball joint such that the valve stem (10) is positionable at different angles to the electronic module (4).

6 Claims, 4 Drawing Sheets

(56) References Cited

U.S. PATENT DOCUMENTS

| | | |
|---|---|---|
| 7,059,178 B2 | 6/2006 | Fischer et al. |
| 7,516,653 B2 * | 4/2009 | Blossfeld ............ B60C 23/0494 73/146.8 |
| 7,775,095 B2 * | 8/2010 | Yu ....................... B60C 23/0494 73/146 |
| 2009/0206294 A1 | 8/2009 | Yu |
| 2011/0315238 A1 | 12/2011 | Li |
| 2012/0017672 A1 | 1/2012 | Uh |
| 2012/0312089 A1 | 12/2012 | Li |
| 2014/0318231 A1 | 10/2014 | Lo |
| 2015/0000763 A1 | 1/2015 | Recker et al. |
| 2015/0136244 A1 | 5/2015 | Kempf |
| 2016/0167463 A1 | 6/2016 | Gout et al. |
| 2017/0043462 A1 | 2/2017 | Brebant |
| 2019/0030966 A1 | 1/2019 | Dementyev et al. |
| 2020/0009926 A1 | 1/2020 | Capdepon et al. |
| 2020/0207165 A1 | 7/2020 | Yamada et al. |
| 2020/0254831 A1 | 8/2020 | Yamada |

FOREIGN PATENT DOCUMENTS

| | | |
|---|---|---|
| CN | 203110847 U | 8/2013 |
| CN | 203876499 U | 10/2014 |
| CN | 104487267 A | 4/2015 |
| CN | 204249747 U | 4/2015 |
| CN | 104626892 A | 5/2015 |
| CN | 205417047 U | 3/2016 |
| CN | 105691116 A | 6/2016 |
| CN | 105799431 A | 7/2016 |
| CN | 108698456 A | 10/2018 |
| DE | 102010050365 A1 | 12/1899 |
| DE | 19610376 A1 | 9/1997 |
| DE | 20110716 U1 | 10/2001 |
| DE | 202016101336 U1 | 3/2016 |
| DE | 102014119430 A1 | 6/2016 |
| EP | 2818506 A1 | 12/2014 |
| FR | 3058360 A1 | 5/2018 |
| GB | 2416846 A | 2/2006 |
| JP | 2013095399 A | 5/2013 |
| TW | M521002 U | 5/2016 |
| WO | 2012139447 A1 | 10/2012 |
| WO | 2018122924 A1 | 7/2018 |
| WO | 2018122925 A1 | 7/2018 |

OTHER PUBLICATIONS

Chinese Office Action dated Sep. 1, 2022, for the counterpart Chinese Patent Application No. 201980080575.X.

Chinese Third Office Action dated Apr. 10, 2023, for the counterpart Chinese Patent Application No. 201980080575.X and DeepL Translation of same.

European Examination Report dated May 5, 2023, for the European Patent Application No. 19 808 575.5.

Japanese Office Action dated Apr. 12, 2022, for the counterpart Japanese Patent Application No. 2021-521208.

Great Britain Combined Search and Examination Report under Sections dated Jun. 14, 2019 for the corresponding GB patent application No. GB 1900275.7.

Great Britain Examination Report under Sections dated Nov. 18, 2020 for the corresponding GB patent application No. GB 1900275.7.

International Search Report and the Written Opinion of the International Searching Authority dated Jan. 29, 2020 for the counterpart PCT Application No. PCT/2019/082049.

Chinese Office Action dated Dec. 8, 2022, for the counterpart Chinese Patent Application No. 201980080575.X.

* cited by examiner

ADAPTER, TYRE PARAMETER MONITORING SYSTEM AND METHOD FOR MOUNTING A TYRE PARAMETER MONITORING SYSTEM ONTO A WHEEL RIM

CROSS REFERENCE TO RELATED APPLICATIONS

This patent application is a National Stage Application under 35 U.S.C. 371 of International Application No. PCT/EP2019/08249 filed on Nov. 21, 2019, which claims priority from GB 1900275.7 filed on Sep. 1, 2019, in the Intellectual Property Office of the United Kingdom and EP 18465629.6 filed on May 12, 2018, in the European Patent Office, the disclosures of which are herein incorporated by reference in their entireties.

BACKGROUND

1. Field

Embodiments of the present application relate to a system for measuring one or more parameters, in particular pressure of a tyre fitted to a vehicle wheel.

The system is used to inform the driver of any abnormal variation in the measured parameter, for example the tyre pressure. Such systems typically include an inflation valve and an electronic module. The inflation valve is positioned in a bore or hole in the wheel rim and the electronic module is arranged inside the tyre and is coupled with the inflation valve.

2. Description of Related Art

One type of tyre parameter monitoring system or tyre pressure monitoring system (TPMS) is known as the snap-in type, in which the inflation valve positioned on the outside of the wheel rim extends through a bore in the wheel rim and is connected to an electronic unit positioned on the inside of the wheel rim by a snap-in connection. Snap-in valves include an elastically deformable stem. An example of such a snap-in system is disclosed in EP 2 818 506 A1.

Another type of tyre parameter monitoring system is known as the clamp-in type. For the clamp-in type it is possible to fasten the electronic module in various angular positions with respect to the wheel rim. This enables the system to be mounted on wheel rims of different designs. An example of such a clamp-in system is disclosed in U.S. Pat. No. 7,059,178 B2.

Depending on various factors, a system of either the snap-in type or the clamp-in type may be desirable. In order to simplify assembly and reduce costs, it would be desirable to use components for both snap-in type and clamp-in type tyre parameter monitoring systems.

SUMMARY

According to an aspect of the present application, a tyre parameter monitoring system, for example a tyre pressure monitoring system, is provided that comprises an electronic module with a fitting for a snap-in valve, a ball stud coupled to the fitting and a valve stem for a clamp-in valve. The valve stem has a ball socket that is coupled to the ball stud to form a ball joint such that the valve stem is positionable at different angles to the electronic module.

The system may be considered to include an adapter which provides an articulated ball joint between the valve stem and the electronic module by the use of a ball socket in the valve stem and a ball stud that is coupled to the fitting. Thus, a clamp-in valve can be used with an electronic module having a fitting for a snap-in valve. The electronic module can, therefore, be used with both snap-in valves and clamp-in valves. The clamp-in valve is also positionable at different angles to the electronic module so that the system with a clamp-in valve can be used for wheel rims of differing designs which require differing angles between the valve stem and the electronic module.

In an embodiment, the ball joint further comprises a connection stem extending from the ball stud and the connection stem is coupled to the fitting of the housing. The head of the ball joint, i.e. the ball stud, protrudes from the electronic module. In the mounted and assembled condition, the head of the ball joint, i.e. ball stud, is positioned outside of the wheel rim and the electronic module with the fitting is positioned on the inside of the wheel rim and inside the tyre.

The ball stud of the ball joint has a diameter that is greater than a diameter or width of the connection stem. The ball stud, therefore, extends laterally outwardly or radially substantially symmetrically from a longitudinal axis of the connection stem and provides a head having a diameter that is greater than a diameter or width of the connection stem. The ball stud provides a spherical joint surface which is larger than a hemisphere and, therefore, allows additional radial movement of the ball socket around the ball stud with respect to the longitudinal axis of the connection stem.

In some embodiments, the fitting for a snap-in valve in the electronic module comprises an aperture. The connection stem may be aligned with or positioned in and extend through the aperture.

In some embodiments, the connection stem comprises an inner thread and is engaged with a screw to secure the valve stem with the fitting and the electronic module. The connection stem and the screw are positioned on opposing sides of the aperture of the fitting. The screw is positioned within the tyre and the connection stem extends through the wheel rim such that the ball joint is positioned on the outside of the wheel rim.

The connection stem may extend through the aperture from a first side of the fitting and be secured to the fitting by a screw engaging with the inner thread, the screw being positioned on a second side of the fitting that opposes the first side.

In some embodiments, the fitting comprises a mounting plate comprising the aperture and one or more lateral gusset plates. The mounting plate and the lateral gusset plates may extend substantially perpendicularly to the upper surface of the housing of the electronic module. The lateral gusset plate(s) may be positioned at the end(s) of the mounting plate and provide mechanical support for the mounting plate. The fitting may have an L-shape in plan view, in the case of one lateral gusset plate or a U-shape in plan view in the case of two lateral gusset plates.

The tyre parameter monitoring system may further include a nut, a washer and a seal. The position of the valve stem with respect to the electronic module may be fixed by securing the nut and the seal to a distal end of the valve stem and to an outer surface of the wheel rim.

In some embodiments, the electronic module includes a housing that accommodates a tyre pressure sensor unit.

Embodiments of the present application also provide an adapter for mounting a clamp-in valve on a snap-in housing of a tyre parameter monitoring system, whereby the clamp-in valve is variably positionable with respect to the snap-in housing. The adapter comprises a ball stud and a connection stem. The connection stem is securable to the snap-in housing and the ball stud is engageable with a ball socket in a valve stem to form a ball joint.

The housing may be formed by or part of an electronic module which may accommodate a sensor unit, for example a tyre pressure sensor unit.

The connection stem may have an outer dimension, for example an outer diameter, that is adapted to fit within an aperture of the snap-in housing. The connection stem may be securable to the snap-in housing by a screw arranged on an opposing side of the ring that is engageable with the inner thread of the connection stem.

A method for mounting a tyre parameter monitoring system to a wheel rim is also provided. The method comprises providing an adapter having a ball stud and a connection stem, inserting the connection stem into a hole in an outer surface of the wheel rim, securing the connection stem to a snap-in electronic module positioned on an inner surface of the wheel rim and engaging the ball stud with a ball socket of a valve stem to provide an articulated ball joint between the valve stem and the adapter.

Thus, a clamp-in type valve stem is coupled to a snap-in electronic module by means of the adapter. The adapter enables the valve stem to be positioned at different angles to the electronic module by means of the articulated ball joint between the valve stem and the adapter. The angle between the connection stem of the adapter and the snap-in electronic module is fixed.

In an embodiment, the method further comprises placing a seal and a washer over the valve stem on an outer side of the wheel rim and securing the valve stem to the outer surface of the wheel rim by a nut engaging with the seal, an outer thread of the valve stem and the outer surface of the wheel rim.

In an embodiment, the nut that is positioned on the outer surface of the wheel rim is tightened to clamp the sealing washer between the valve stem and the wheel rim, thus pulling the valve stem inside the washer, exerting pressure on the ball socket and blocking rotation of the valve stem around the head of the ball joint so as to provide an auto locking mechanism.

The connection stem may be secured to the snap-in housing by a screw connection. For example, the connection stem may be inserted into an aperture in the snap-in housing and engaged to the snap-in housing by means of a screw positioned on the opposing side of the aperture that engages with an inner thread of the connection stem. In some embodiments, the connection stem comprises an outer thread which is engaged with a nut positioned on the opposing side of the aperture.

The articulated ball joint formed by the ball stud and the ball socket also provides a self-adjustment mechanism to fix the angle between the valve stem and the electronic module when the valve stem and the electronic module are engaged with the wheel rim. This fixes the position of the sensor on the wheel rim during spinning. As the valve stem is placed on the wheel rim, the valve angle can be easily adjusted in order to fit the electronic module onto the wheel rim. After the initial fitting has been completed and the electronic module touches the wheel rim well, the nut positioned on the opposing side of the wheel rim is tightened to clamp the sealing washer between the valve stem and the wheel rim. This also has the effect of pulling the valve stem. Pulling the valve stem inside the sealing washer exerts pressure on the ball socket and blocks the rotation of the valve stem around the ball stud so as to provide an auto locking mechanism. The torque applied to the nut may be 8 Nm, which is sufficient to maintain the valve stem and the sensor in the desired position during high acceleration spinning.

The electronic unit module can be used with a snap-in type of valve and a clamp-in type of valve whilst maintaining the flexible positioning, in particular, variable angle between the clamp-in valve and the electronic module.

BRIEF DESCRIPTION OF THE DRAWINGS

Embodiments will now be described with reference to the drawings.

DETAILED DESCRIPTION

Figure 1A:
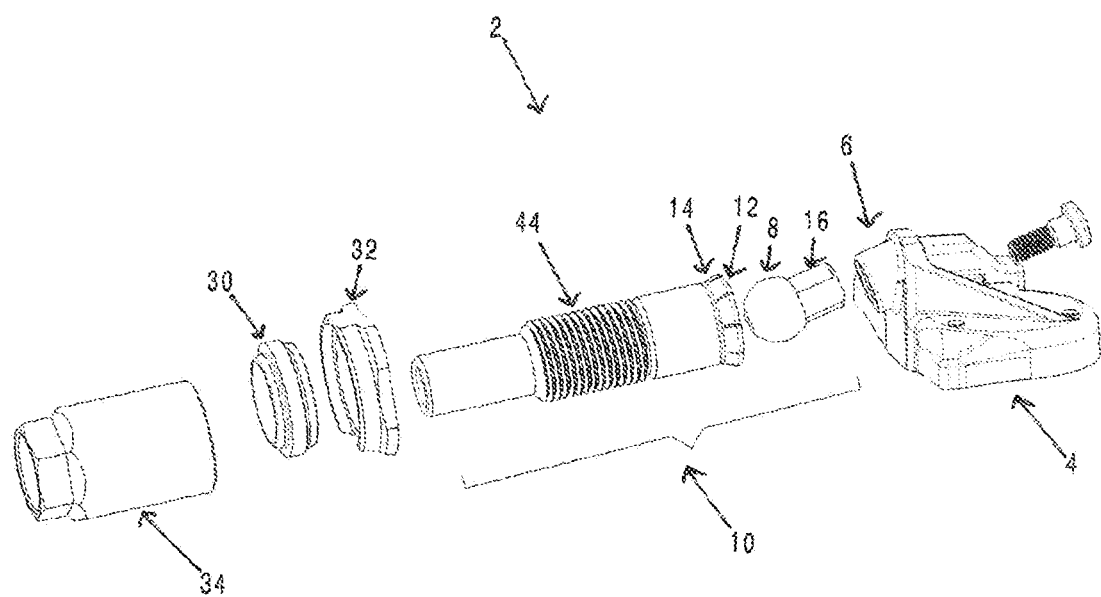
FIG. 1a illustrates an exploded view of the parts of a tyre parameter monitoring system according to an embodiment of the invention.
Figure 2:
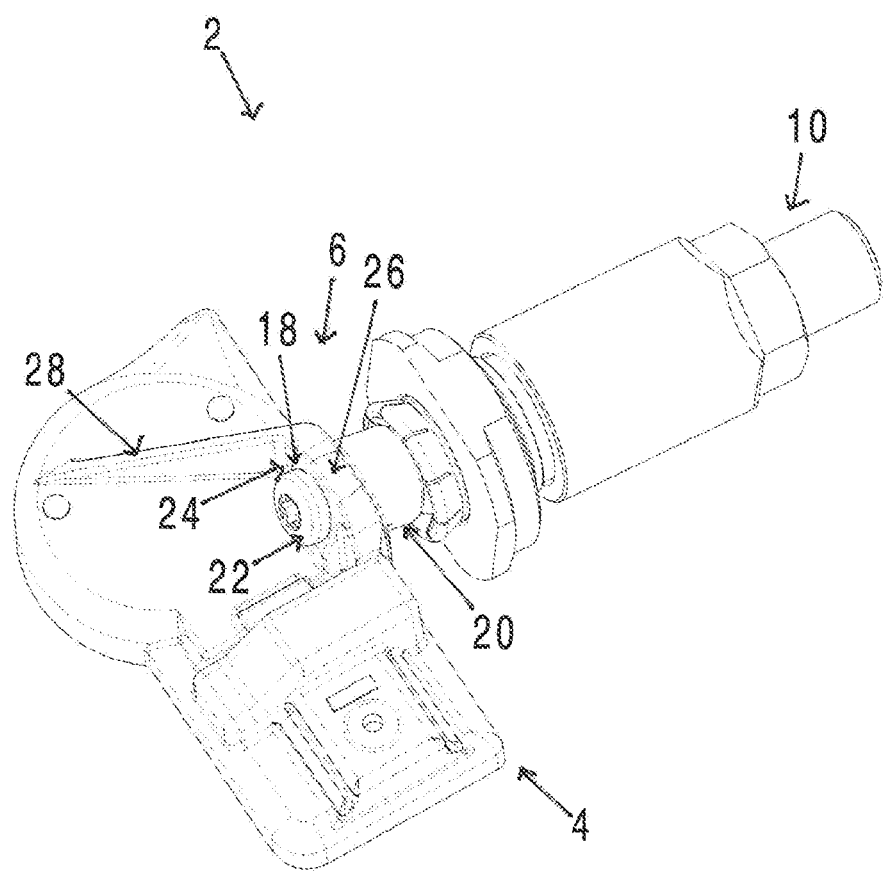

FIG. 1a illustrates an exploded view and FIG. 2 illustrates an assembled view of the components of a tyre parameter monitoring system 2, in particular a tyre pressure monitoring system, according to an embodiment of the invention. The tyre parameter monitoring system 2 includes an electronic module 4 which includes a fitting 6 for a snap-in valve, a ball stud 8 coupled to the fitting 6 and, therefore, to the electronic module 4 and a valve stem 10 for a clamp-in valve.

Figure 1B:
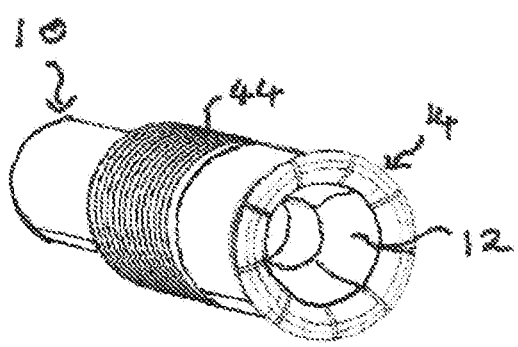
FIG. 1b illustrates a further view of the valve stem of the tyre parameter monitoring system of FIG. 1a, FIG. 2 illustrates an assembled view of the tyre parameter monitoring system.

The valve stem 10 has a substantially elongate shape with a ball socket 12 formed in an inner surface at one end 14 of the valve stem 10. The ball socket 12 can be seen in FIG. 1b. The valve stem 10 may be outwardly flared at the end 14 to form the ball socket 12 such that the valve stem has a flange at the end 14.

The ball socket 12 is coupled to the ball stud 8 such that the valve stem 10 is positionable at different angles to the electronic module 4. The ball stud 8 includes a connection stem 16 which extends from one side of the ball stud 8 and which is coupled to the fitting 6 of the electronic module 4. The ball stud 8 has a diameter that is greater than a diameter or width of the connection stem 16. The electronic module 4 includes a housing in which the electronics for the sensor (s) for the tyre parameter monitoring system are positioned.

In some embodiments, the fitting 6 of the electronic module 4 includes an aperture 18. The connection stem 16 is aligned with, and may extend through, the aperture 18 at an outer side 20 of the fitting 6. The connection stem 16 may include an inner thread which is coupled to a screw 22 positioned on an opposing inner side 24 of the fitting 6. In some embodiments, the fitting 6 includes a mounting plate 26 which may be supported by one or more lateral gusset plates 28. The tyre parameter monitoring system 2 may also include a seal 30, a washer 32 and a nut 34 which are adapted to fit over the valve stem 10.

Figure 3A:
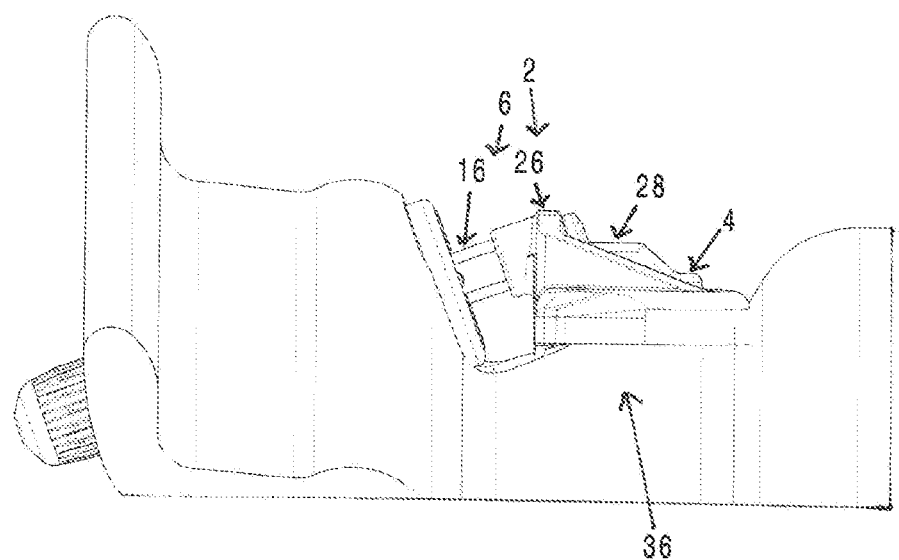
FIG. 3a illustrates the tyre pressure monitoring system equipped with a snap-in valve mounted on a wheel rim at a fixed angular position.
Figure 3B:
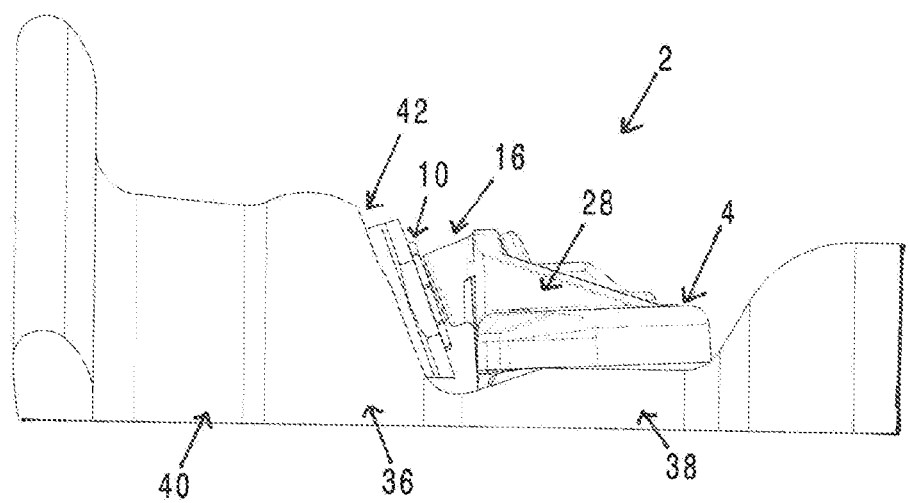
FIG. 3b illustrates the tyre pressure monitoring system equipped with a clamp-in valve which permits an adjustable angle that is mounted on a wheel rim at a convenient angle for the best fitment.

FIGS. 3a and 3b illustrate the tyre parameter monitoring system 2 mounted on a wheel rim 36. FIG. 3a illustrates the tyre parameter monitoring system 2 equipped with a snap-in valve 50 mounted on a wheel rim 36 at a fixed angular position.

FIG. 3b illustrates the tyre parameter monitoring system 2 equipped with a clamp-in valve. The clamp-in valve has the valve stem 10 that enables the system to be mounted at an adjustable angle on the wheel rim 36. The clamp-in valve is mounted on the wheel rim 36 at a convenient angle for the best fitment due to the valve stem 10. The angular position between the valve stem 10 and the electronic module 4 varies. The electronic module 4 and a base portion of the connection stem 16 are positioned on an inner surface 38 of the wheel rim 36 and, in operation, within the tyre. The valve stem 10, the ball stud 8, the seal 30, the washer 32 and the nut 34 are positioned on an outer surface 40 of the wheel rim 36.

The tyre parameter monitoring system 2 is mounted on the wheel rim 36 by inserting the connection stem 16 into a hole 42 in the wheel rim 36 from the outer surface 40 of the wheel rim 36 and securing it to the fitting 6 of the electronic module 4 which is positioned on the inner surface 38 of the wheel rim 36. The connection stem 16 may be secured to the fitting 6 by use of the screw 22. The ball joint 8 is arranged on the outer surface 40 of the wheel rim 36. The ball stud 8 is engaged with the ball socket 12 of the valve stem 10 such that the connection stem 16 of the ball stud 8 protrudes from the axial end 14 of the valve stem 10. The valve stem 10 may be locked into position with respect to the electronic module 4 by placing the seal 30, the washer 22 and the nut 34 over the valve stem 10 and by tightening the nut 34 onto an outer thread 44 of the valve stem 10 so as to pull the ball stud 8 into the ball socket 12 to lock the angular position of the valve stem 10 with respect to the connection stem 16 and the electronic module 4 and to secure the valve stem 10 onto the outer surface 40 of the wheel rim 36.

The articulated ball joint provided between the ball stud 8 and the ball socket 12 enables the angle between the valve stem 10 and the electronic unit 4 to vary, thus enabling the tyre parameter monitoring system 2 to be used on different types of wheel rim.

Figure 4A:
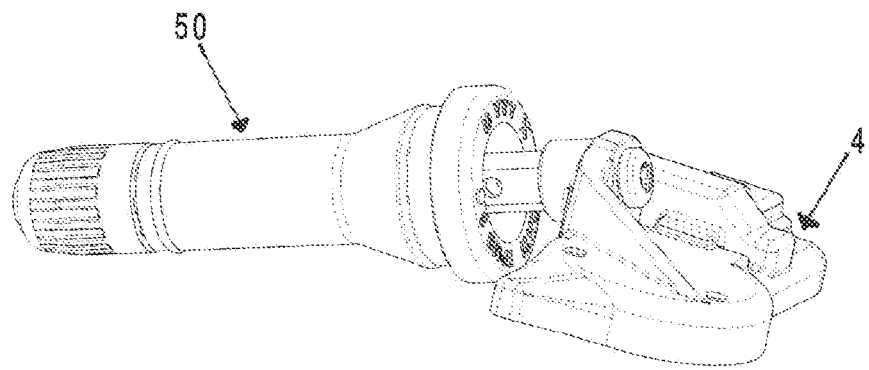
FIG. 4a illustrates a snap-in type valve mounted on the electronic module.
Figure 4B:
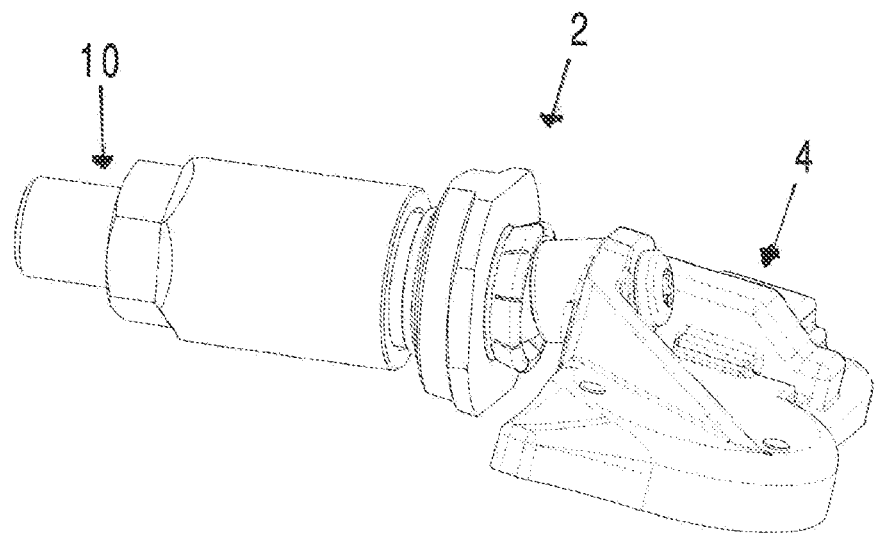
FIG. 4b illustrates a clamp-in valve mounted on the electronic module.

FIG. 4a illustrates the electronic housing 4 coupled with a snap-in type valve 50 and FIG. 4b illustrates the electronic module 4 coupled with the valve stem 10. Both a snap-in valve and a clamp-in valve can be used with a snap-in type electronic module 4, thus reducing the number of parts which are required to produce both types of system. Additionally, the clamp-in valve can be mounted at different angular positions with respect to the electronic module 4 so that the system 2 can be used with different wheel rims.

The invention claimed is:

1. A tire parameter monitoring system comprising:
an electronic module comprising a snap-in fitting configured to be coupled to a snap-in valve;
a ball stud comprising a connection stem configured to be coupled to the snap-in fitting;
a clamp-in valve stem comprising a ball socket disposed at a first distal end of the clamp-in valve stem and an outer thread at a second distal end of the clamp-in valve stem opposite of the first distal end of the clamp-in valve stem, the ball socket configured to be coupled to the ball stud to form an articulated ball joint, the articulated ball joint configured to position the clamp-in valve stem at different angles relative to the electronic module;
a washer disposed on the second distal end of the clamp-in valve stem;
a seal disposed on the washer at the second distal end of the clamp-in valve stem; and
a nut disposed on the seal at the second distal end of the clamp-in valve stem, the nut configured to be tightened onto the outer thread to pull the ball stud into the ball socket and lock an angular position of the clamp-in valve stem with respect to the connection stem and the electronic module and secure the clamp-in valve stem onto an outer surface of a wheel rim.

2. The tire parameter monitoring system according to claim 1, wherein the connection stem is coupled to the snap-in fitting of the electronic module and the ball socket is coupled to the ball stud.

3. The tire parameter monitoring system according to claim 2, wherein the snap-in fitting comprises an aperture and the connection stem extends through the aperture.

4. The tire parameter monitoring system according to claim 2, wherein the connection stem comprises an inner thread configured to be secured to the snap-in fitting by a screw engaging with the inner thread, the screw being positioned on an opposing side of the snap-in fitting to the connection stem.

5. The tire parameter monitoring system according to claim 4, wherein the snap-in fitting comprises a mounting plate comprising the aperture and one or more lateral gusset plates.

6. The tire parameter monitoring system according to claim 5, wherein the electronic module comprises a tire pressure sensor unit configured to monitor a tire pressure of a tire coupled to the wheel rim.

* * * * *